United States Patent
Matsushima et al.

(10) Patent No.: US 10,496,055 B2
(45) Date of Patent: Dec. 3, 2019

(54) MACHINE LEARNING DEVICE, CNC DEVICE AND MACHINE LEARNING METHOD FOR DETECTING INDICATION OF OCCURRENCE OF CHATTER IN TOOL FOR MACHINE TOOL

(71) Applicant: FANUC CORPORATION, Yamanashi (JP)

(72) Inventors: Takahiko Matsushima, Yamanashi (JP); Yoshito Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 84 days.

(21) Appl. No.: 15/840,211

(22) Filed: Dec. 13, 2017

(65) Prior Publication Data

US 2018/0164757 A1 Jun. 14, 2018

(30) Foreign Application Priority Data

Dec. 14, 2016 (JP) .................. 2016-242580

(51) Int. Cl.
*G06F 19/00* (2018.01)
*G05B 13/04* (2006.01)
(Continued)

(52) U.S. Cl.
CPC ......... *G05B 13/042* (2013.01); *G05B 13/027* (2013.01); *G05B 19/406* (2013.01);
(Continued)

(58) Field of Classification Search
CPC .. G05B 13/042; G05B 13/027; G05B 19/406; G05B 2219/33296; G05B 2219/37433
See application file for complete search history.

(56) References Cited

U.S. PATENT DOCUMENTS 4,559,600 A * 12/1985 Rao .................... G05B 19/4163
340/680
5,566,092 A 10/1996 Wang et al.
(Continued)

FOREIGN PATENT DOCUMENTS

JP S64-62797 A 3/1989
JP H4-53649 A 2/1992
(Continued)

OTHER PUBLICATIONS

Dijk et al, Real-Time Detection and Control of Machine Tool Chatter in High Speed Milling, Oct. 22, 2008, Eindhoven University of Technology, p. 1-8. (Year: 2008).*
(Continued)

*Primary Examiner* — Kidest Bahta
(74) *Attorney, Agent, or Firm* — Hauptman Ham, LLP

(57) ABSTRACT

A machine learning device for detecting an indication of an occurrence of chatter in a tool for a machine tool, includes a state observation unit which observes at least one state variable of a vibration of the machine tool itself, a vibration of a building in which the machine tool is installed, an audible sound, an acoustic emission and a motor control current value of the machine tool, in addition to a vibration of the tool; and a learning unit which generates a learning model based on the state variable observed by the state observation unit.

11 Claims, 4 Drawing Sheets

(51) Int. Cl.
  *G05B 13/02*   (2006.01)
  *G05B 19/406*  (2006.01)
  *G06N 3/08*    (2006.01)
  *G06N 3/04*    (2006.01)

(52) U.S. Cl.
  CPC ......... *G06N 3/0454* (2013.01); *G06N 3/088* (2013.01); *G05B 2219/33296* (2013.01); *G05B 2219/37433* (2013.01); *G05B 2219/37434* (2013.01)

(56) References Cited

U.S. PATENT DOCUMENTS

| | | | |
|---|---|---|---|
| 2004/0176926 A1 | 9/2004 | Edie et al. | |
| 2007/0067059 A1* | 3/2007 | Travez | B23Q 15/12 700/160 |
| 2008/0133439 A1* | 6/2008 | Ikeda | G01H 1/003 706/20 |
| 2013/0304247 A1* | 11/2013 | Mackman | G05B 19/406 700/174 |
| 2016/0070253 A1* | 3/2016 | Dunkin | G05B 19/4065 700/174 |

FOREIGN PATENT DOCUMENTS

| | | |
|---|---|---|
| JP | H11-10535 A | 1/1999 |
| JP | 2003-89037 A | 3/2003 |
| JP | 2005-63057 A | 3/2005 |
| JP | 2005-111603 A | 4/2005 |
| JP | 2006-102927 A | 4/2006 |
| JP | 2008-137102 A | 6/2006 |
| JP | 2008-27210 A | 2/2008 |
| JP | 2011-88268 A | 5/2011 |
| JP | 2012-152835 A | 8/2012 |
| JP | 2013-36912 A | 2/2013 |
| JP | 2015-168057 A | 9/2015 |
| JP | 2015-170281 A | 9/2015 |
| JP | 2016-83759 A | 5/2016 |
| JP | 5992087 B1 | 9/2016 |
| WO | 2013/105164 A1 | 7/2013 |

OTHER PUBLICATIONS

VLi et al., Detection and Analysis of Chatter Occurrence in Micro Milling Process, Jan. 13, 2014, The University of New South Wales, Sydney, NSW 2052, Australia, p. 1-31 (Year: 2014).*

* cited by examiner

MACHINE LEARNING DEVICE, CNC DEVICE AND MACHINE LEARNING METHOD FOR DETECTING INDICATION OF OCCURRENCE OF CHATTER IN TOOL FOR MACHINE TOOL

RELATED APPLICATIONS

The present application claims priority to Japanese Patent Application No. 2016-242580 filed on Dec. 14, 2016, the disclosure of which is hereby incorporated by reference herein in its entirety.

BACKGROUND OF THE INVENTION

1. Field of the Invention

The present invention relates to a machine learning device, a CNC device and a machine learning method for detecting an indication of an occurrence of chatter in a tool for a machine tool.

2. Description of the Related Art

Conventionally, in, for example, machine tools controlled by CNC (computer numerical control) devices, chatter sometimes occurs in a specific machining pass owing to the progression of wear of tools, even under the same machining conditions. More specifically, for example, in a machining cycle such as thread cutting, the deeper a thread is cut, the larger the size of the contact area of the tool tip, and the more chatter tends to occur owing to the progression of wear.

An occurrence of chatter (occurrence of chatter in a tool for a machine tool) causes poor machining of workpieces. Especially when a machine tool is brought into an automatic operation during evening hours, if one workpiece has chatter marks, every workpiece machined thereafter will also have chatter marks, thus producing a large number of poor workpieces. Therefore, it is desired to detect the occurrence of chatter in a tool or to detect an indication of the occurrence of chatter in the tool, in order to reduce the number of poor workpieces.

Conventionally, for example, Japanese Laid-Open Patent Publication No. 2012-152835 (Patent Document 1) discloses a vibration determination device having improved chatter vibration detection accuracy by preventing false detection of unstable vibrations caused by vibration of the machine tool itself, an abrupt disturbance vibration and machining, in a machine tool that performs machining while rotating a tool or a workpiece. The vibration determination device determines that the vibration is a chatter vibration when the maximum value of vibration acceleration continues beyond a threshold value for a certain period of time, and the frequency variation in the vibration acceleration is within a certain range.

Conventionally, for example, Japanese Laid-Open Patent Publication No. 2013-036912 (Patent Document 2) discloses a chatter vibration detection device that may prevent poor machining caused by chatter vibration, may select machining conditions in which chatter vibration does not occur, and may reliably detect chatter vibration. In such a chatter vibration detection device, a first vibration is measured at some point in time, and a second vibration is measured after the lapse of a certain time, to calculate first and second power spectra of the first and second vibrations, respectively. The degree of increase in the magnitude of vibration of the second power spectrum, with respect to the magnitude of vibration of the first power spectrum, is calculated. When the degree of increase is equal to or greater than a certain value, it is determined that chatter vibration has occurred.

As described above, conventionally, various proposals have been made to reduce poor machining of workpieces by reliably detecting chatter vibration. However, the actual chatter occurrence mode is different depending on the machining program, the status of use of the tool, and the like.

Thus, for example, in the technique described in the patent document 1, the vibration acceleration (and the continuous time and variation of the vibration acceleration) is used as a determination parameter to prevent false detection, but it is difficult to obtain sufficient detection accuracy unless an appropriate reference value (threshold value) is determined in accordance with the machining properties.

Moreover, for example, in the technique described in Patent Document 2, since an increase in the vibration of an entire frequency band from the vibration of a constant frequency band at some point in time is compared with a reference value (threshold value), there is no need to set a frequency band in accordance with a status of use of a tool. However, it is still difficult to obtain sufficient detection accuracy unless an appropriate reference value (threshold value) is determined in accordance with machining properties.

In other words, the techniques described in Patent Documents 1 and 2 are not possible to detect chatter with high accuracy while flexibly responding to various chatter occurrence modes, which are different depending on the machining program and the status of use of a tool.

Considering the above-described problems of the prior art, an object of the present invention is to reduce the number of poor workpieces by detecting an indication of the occurrence of chatter in a tool for a machining tool. In other words, an object of the present invention is to reduce the number of poor workpieces by easily detecting an indication of the occurrence of chatter in a tool for a machining tool, without examining appropriate reference values nor changing of settings in accordance with machining properties. This application mainly describes the occurrence of chatter during machining, but the occurrence of chatter is often caused by damage to the tool, and as a matter of course, the present invention is effective at detecting damage to the tool.

SUMMARY OF INVENTION

According to a first aspect of the present invention, there is provided a machine learning device for detecting an indication of an occurrence of chatter in a tool for a machine tool, includes a state observation unit which observes at least one state variable of a vibration of the machine tool itself, a vibration of a building in which the machine tool is installed, an audible sound, an acoustic emission and a motor control current value of the machine tool, in addition to a vibration of the tool; and a learning unit which generates a learning model based on the state variable observed by the state observation unit.

The learning unit may generate the learning model by performing unsupervised learning based on the state variable during normal operation in which no chatter occurs in a specific machining block. The learning unit may generate and output a normal score during the normal operation in which no chatter occurs in the specific machining block, and an abnormal score when there is an indication of the occurrence of chatter in the machining block, and the machine learning device may further include an output utilization unit which determines whether a score based on the state variable of the machining block corresponds to the normal score or the abnormal score, in order to detect an indication of the occurrence of chatter in the tool for the machine tool.

The machine learning device may further include a neural network. The machine learning device may be connectable to at least one different machine learning device and exchanges or shares the learning model generated by the learning unit of the machine learning device with the at least one different machine learning device in a mutual manner.

The machine tool may include a vibration sensor which detects the vibration of the machine tool itself and provided in a holder or bit of the tool; and at least one of an audible sound sensor which detects the audible sound, and an acoustic emission sensor which detects the acoustic emission. The machine tool may include a vibration sensor which detects the vibration of the building in which the machine tool is installed. The machine tool may include a current sensor which detects a motor control current value of the machine tool. The current sensor may be provided in a motor amplifier for driving a motor of the machine tool.

According to a second aspect of the present invention, there is provided a CNC device including a learning circuit which constitutes the machine learning device according to the above described first aspect, and wherein the CNC device may control the machine tool. The CNC device may further include a determination circuit which compares a score outputted from the learning circuit with a certain determination reference value to make a determination; and a CPU which outputs a stop signal to the machine tool based on a determination result from the determination circuit. The CPU may output a warning signal to a host management system based on the determination result from the determination circuit.

According to a third aspect of the present invention, there is provided a machine learning method for detecting an indication of an occurrence of chatter in a tool for a machine tool, including observing at least one state variable of a vibration of the machine tool itself, a vibration of a building in which the machine tool is installed, an audible sound, an acoustic emission and a motor control current value of the machine tool, in addition to a vibration of the tool; and generating a learning model by unsupervised learning based on the observed state variable.

BRIEF DESCRIPTION OF THE DRAWINGS

The present invention will be understood more clearly by referring to the following accompanying drawings.

DETAILED DESCRIPTION

Figure 1:
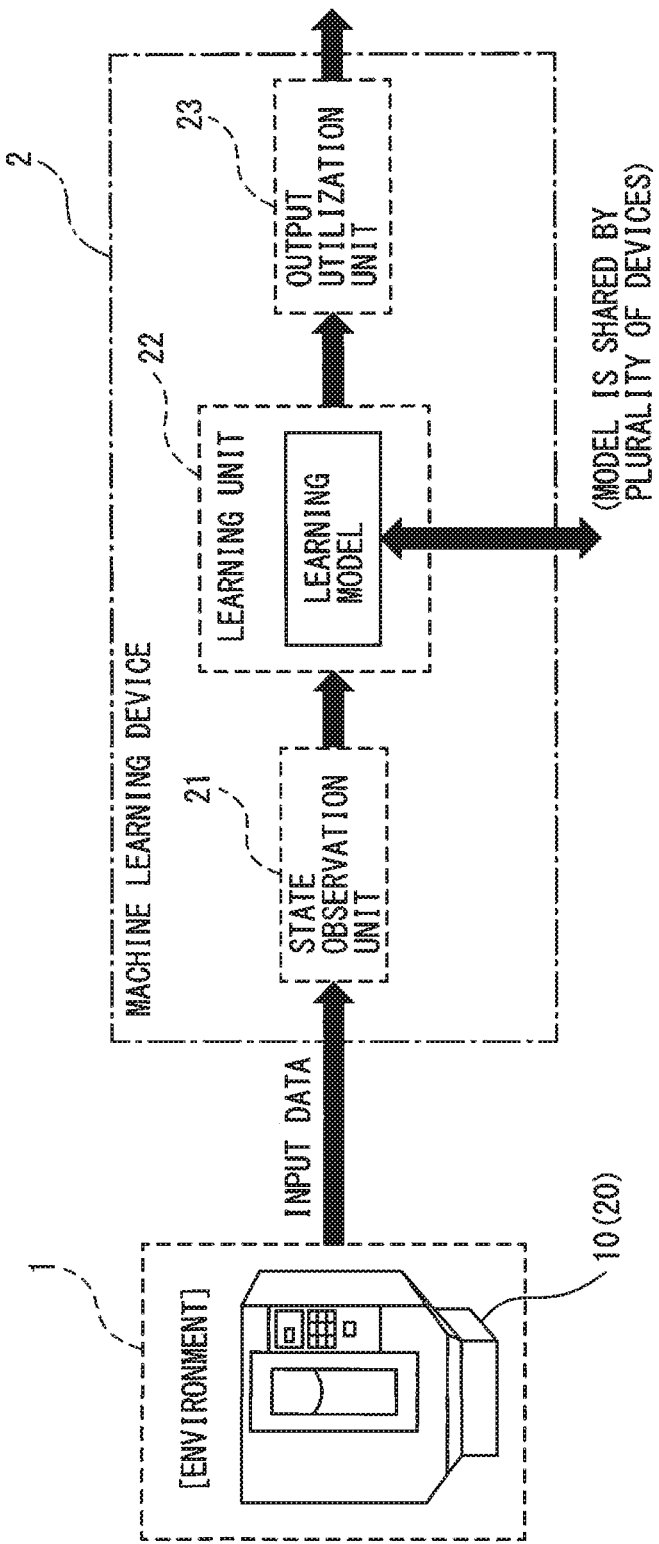
FIG. 1 is a schematic block diagram of an embodiment of a machine learning device according to the present invention.

Hereinafter, embodiments of a machine learning device, a CNC device and a machine learning method according to the present invention will be described below in detail with reference to the accompanying drawings. FIG. 1 is a schematic block diagram of an embodiment of the machine learning device according to the present invention. As shown in FIG. 1, the machine learning device 2 according to the embodiment includes a state observation unit 21, a learning unit 22, and an output utilization unit 23.

The state observation unit 21 receives, for example, the vibration of a tool of the machine tool 10 controlled by a CNC device 20, the vibration of the machine tool 10 itself, the vibration of a building in which the machine tool 10 is installed, an audible sound, an acoustic emission (AE waves and elastic waves) and a motor control current value of the machine tool 10, as input data supplied from the environment 1. The input data from the environment 1 to the state observation unit 21 may not include all of the vibration of the machine tool 10 itself, the vibration of the building in which the machine tool 10 is installed, the audible sound, the acoustic emission and the motor control current value of the machine tool 10, except for the vibration of the tool. The input data may be at least one of the vibration of the machine tool 10 itself, the vibration of the building in which the machine tool 10 is installed, the audible sound, the acoustic emission and the motor control current value of the machine tool 10, in addition to the vibration of the tool, and may be, for example, the vibration of the tool and the audible sound, or the vibration of the tool and the motor control current value of the machine tool 10.

The learning unit 22 generates a learning model by unsupervised learning. The learning unit 22 designates a machining block in which chatter tends to occur in a specific program for machining a workpiece, and performs unsupervised learning using input data during normal operations of the block. In other words, the learning unit 22 generates and outputs normal scores of the machining block during normal operations without the occurrence of chatter, by unsupervised learning. The learning unit 22 also generates and outputs abnormal scores of the machining block during abnormal operations having indications of the occurrence of chatter, by unsupervised learning.

The output utilization unit 23 receives an output score from the learning unit 22, and determines whether the output score is a normal score or an abnormal score, to detect an indication of the occurrence of chatter in the tool for the machine tool 10. In other words, when a score that is obtained by inputting output data from the state observation unit 21 to the learning model generated by unsupervised learning is abnormal (not normal), in comparison with the normal scores of the learning model during the normal operations, the CNC device 20 determines this as the occurrence of chatter in the tool (including damage to the tool and the like). Note that, the machine learning device 2 may be connected to at least one other machine learning device, and may exchange or share the learning model generated by the learning unit 22 of the machine learning device 2 with the other machine learning device in a mutual manner.

Figure 2:
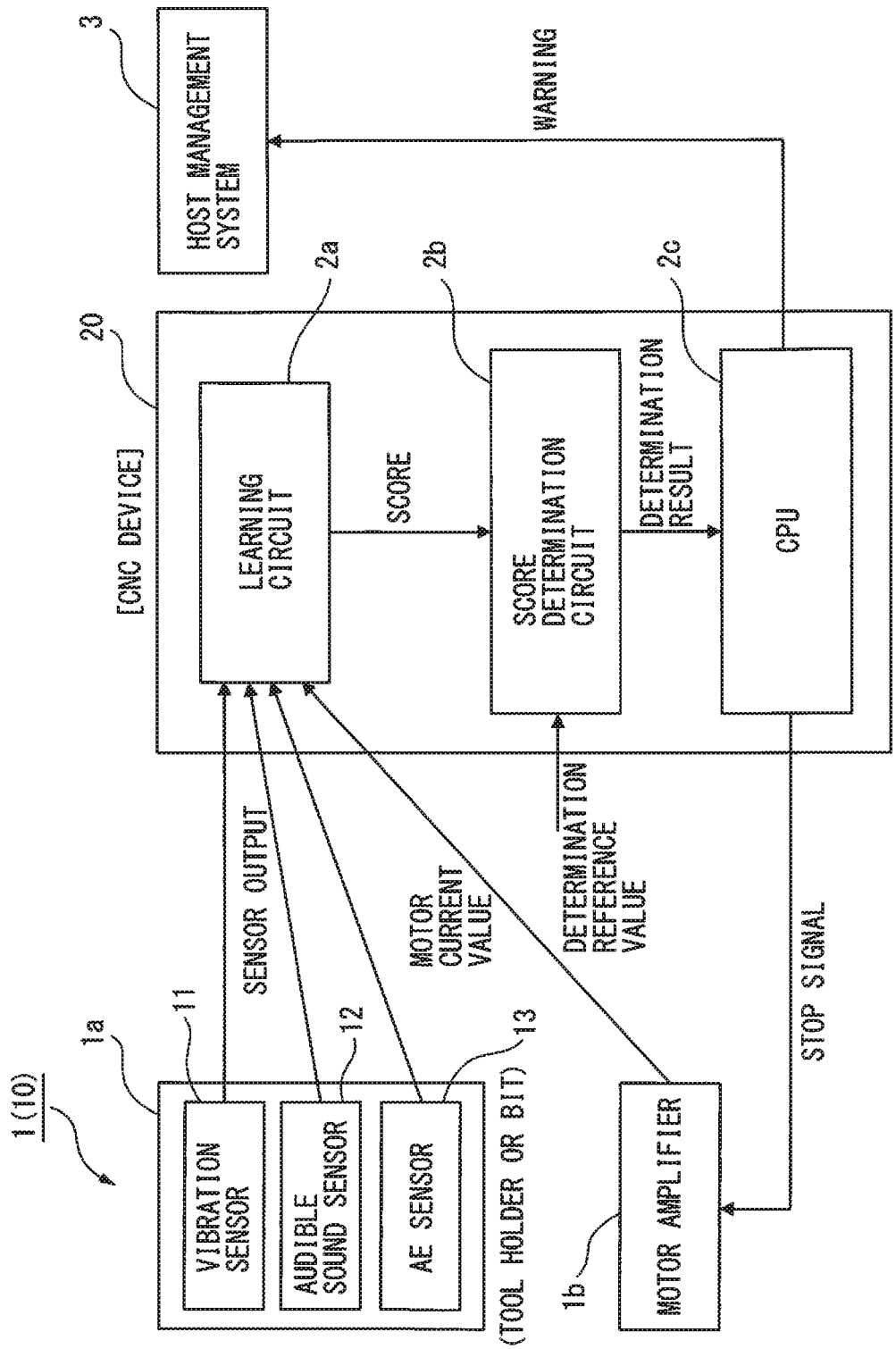
FIG. 2 is a schematic block diagram of an embodiment of a CNC device to which the embodiment of the machine learning device is applied.

FIG. 2 is a schematic block diagram of an embodiment of the CNC device to which this embodiment is applied. As shown in FIG. 2, in the environment 1 (machine tool 10), for example, a vibration sensor 11 for detecting the vibration of a tool 1a, an audible sound sensor 12 for detecting an audible sound and an acoustic emission sensor (AE sensor) 13 for detecting an acoustic emission are provided in the holder or bit of the tool 1a for the machine tool 10. A motor amplifier (servo amplifier) 1b for driving a motor (servomotor) of the machine tool 10 is provided with a current sensor for detecting the current value of the motor.

The CNC device 20 for controlling the machine tool 10 includes a learning circuit 2a, a score determination circuit 2b, and a CPU (MPU: Micro-Processing Unit) 2c. Note that, FIG. 2 depicts the machine learning device 2, which is described with reference to FIG. 1, as the learning circuit 2a, but as a matter of course, the machine learning device 2 is constituted of a neural network corresponding to the learning circuit 2a and a program executed by the CPU 2c.

Since a chatter occurring mode changes depending on a machining program and the status of a tool, there is a correspondence between the chatter occurring mode and each of the values of the vibration sensor, the audible sound sensor and the AE sensor of the tool and the current value of the machine tool (motor). Therefore, as described above, in addition to the value of the vibration sensor, by including the values of the audible sound sensor and the AE sensor and the current value of the motor as determination parameters, it is possible to predict the occurrence of chatter with high accuracy, while flexibly responding to various chatter occurring modes. In other words, the correlation between the chatter occurring mode and the determination parameters is complex, but machine learning may be applied to extract the correlation. Furthermore, by the application of unsupervised machine learning to input data obtained in normal operations with designation of a machining block, correlation between the normal input data and a machining program may be extracted. An abnormal input (including an indication of the occurrence of chatter vibration) during normal operation is certainly detected as an indication of chatter vibration.

As shown in FIG. 2, the learning circuit 2a receives the vibration of the tool 1a, an audible sound and AE waves (elastic waves) from the vibration sensor 11, the audible sound sensor 12 and the AE sensor 13 provided in the holder or bit of the tool 1a, respectively, and a current value of the motor from the current sensor of the motor amplifier 1b. The data (state variables) the learning circuit 2a receives from the machine tool 10 (environment 1) may not include all of the audible sound, the AE waves and the current value of the motor amplifier 1b, except for the vibration of the tool 1a, and furthermore, may include the vibration of the machine tool 10 itself and the vibration of the building in which the machine tool 10 is installed, as described above.

The score determination circuit 2b receives a score and a specific determination reference value from the learning circuit 2a, and makes a comparative determination. The score determination circuit 2b makes a determination on normal score of the machining block generated by the learning circuit 2a during normal operation that has a possibility of the occurrence of chatter based on the determination reference value, and outputs a determination result to the CPU 2c.

Based on the determination result from the score determination circuit 2b, the CPU 2c outputs, for example, a stop signal to the motor amplifier 1b (machine tool 10) to stop the operation of the machine tool 10, and additionally outputs a warning signal to a host management system 3. The learning circuit 2a and the score determination circuit 2b may be contained in the CPU 2c.

An example of a method for learning and determination will be described. Assuming that an output score of the learning circuit 2a (machine learning device 2) has three components, A, B and C, as an example, a user designs a neural network model and learning is performed on the machining block in which it is necessary to detect chatter.

After the completion of learning, data regarding the occurrence of chatter is prepared and inputted to the learning circuit 2a. The range of the normal scores is determined by comparing output scores thereof with normal scores. It is assumed that the normal scores are determined as the following condition 1.

$$A1<A<A2, B1<B<B2, C1<C<C2 \quad \text{(condition 1)}$$

When a score is outside of the range of condition 1, the score determination circuit 2b sends an abnormality-indicating signal to the CPU 2c. Upon receiving the abnormality-indicating signal from the score determination circuit 2b, the CPU 2c issues a warning to the host management system 3 and stops the machine tool 10, if necessary.

Next, unsupervised learning will be described. In this embodiment, only "normal data" is inputted to perform learning. In other words, since this embodiment determines two cases, i.e., "the presence or absence of an indication of the occurrence of chatter" based on input data, learning the features of only one of the cases using data thereof naturally determines the other. When equally inputting and classifying all types of data, a determination unit cannot sufficiently learn unless abnormal data is added as the input data. However, it is difficult and unrealistic to collect a sufficient amount of abnormal data for the learning of the determination unit.

Thus, this embodiment uses unsupervised learning in which only the "normal data" that does not include the occurrence of chatter is used as input and the features thereof are learned, and generates the normal scores of the machining block during normal operation. Since "normal/abnormal" labels are not applied in the course of learning, unsupervised learning is used as machine learning in this embodiment.

Figure 3:
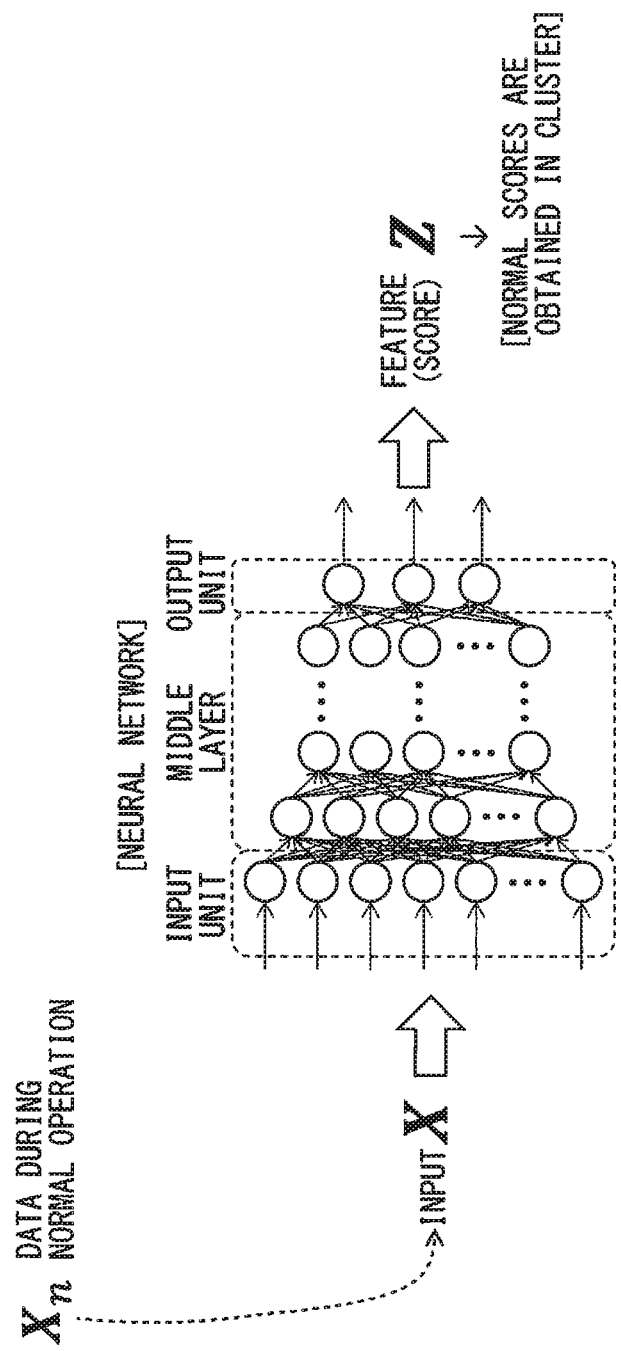
FIG. 3 is a drawing of an example of a learning circuit shown in FIG. 2.

The operation of obtaining an output (score) from input data will be described below. FIG. 3 is a drawing of an example of the learning circuit shown in FIG. 2, and schematically depicts the operation of obtaining a score from input data. As shown in FIG. 3, this embodiment is based on the assumption that a "neural network" is used as the learning circuit 2a, and a general neural network model is applicable thereto.

As shown in FIG. 3, "normal data" that does not include the occurrence of chatter is inputted to an input unit. The neural network includes the input unit, a middle layer and an output unit, and the middle layer is constituted of multiple layers. The output unit of the neural network outputs a feature (score) Z. When the "normal data" is inputted to the input unit, normal scores are obtained in a cluster.

Figure 4:
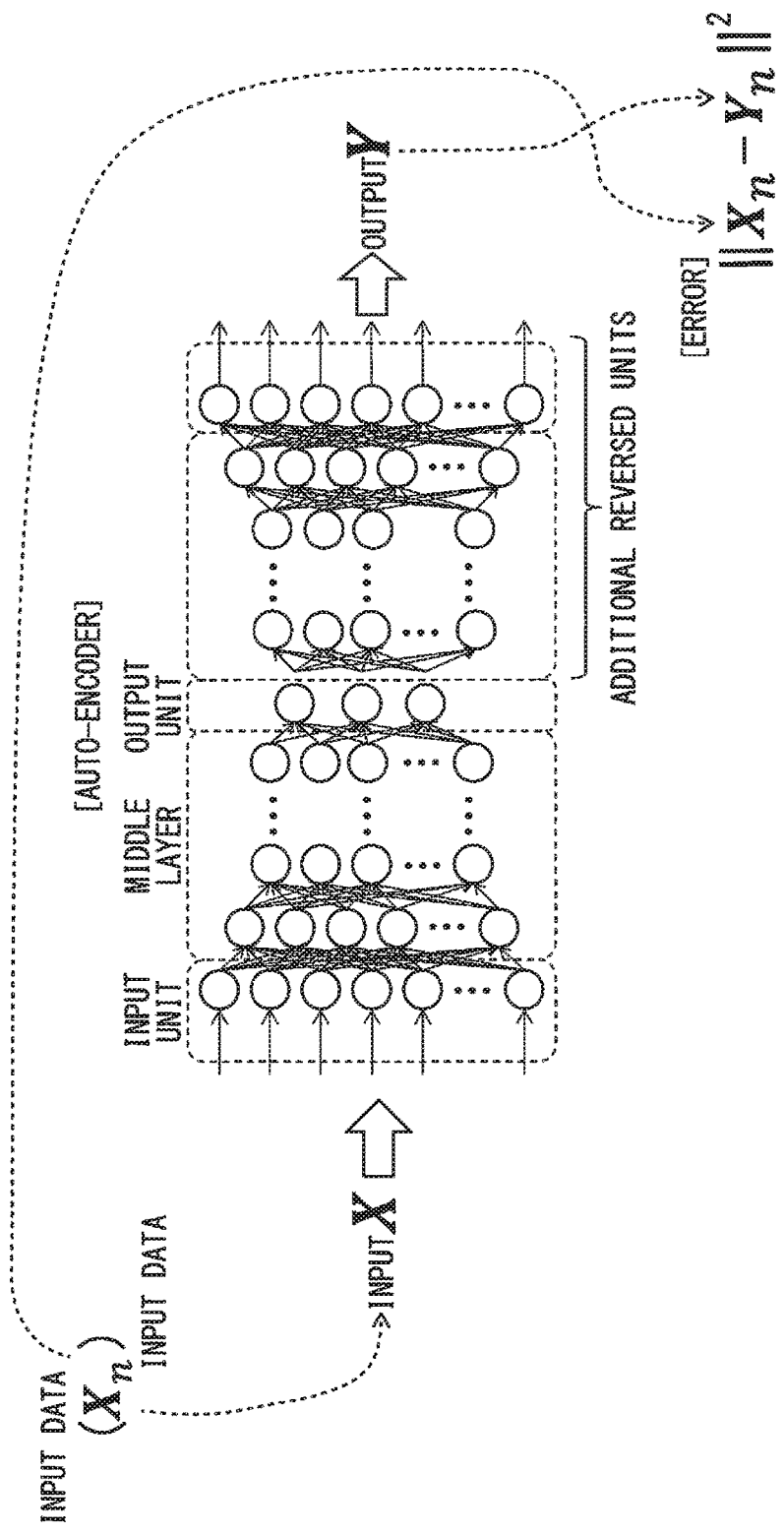
FIG. 4 is a drawing of another example of the learning circuit shown in FIG. 2.

FIG. 4 is a drawing of another example of the learning circuit shown in FIG. 2, and schematically depicts an auto-encoder. As shown in FIG. 4, the neural network includes an input unit, a middle layer, an output unit, and an additional input unit and an additional middle layer that are connected in reverse.

In the auto-encoder shown in FIG. 4, input data (Xn) is inputted to the input unit of the neural network as an input X, and data outputted from the output unit is taken out of the additional middle layer and input unit as an output Y. Thus, an error between the input data Xn (input X) and the output data Yn (output Y) is calculated as $||Xn-Yn||^2$. In other words, an error is calculated using the input data as is as a correct label. Learning is performed so as to minimize the errors, and therefore the features of the input are extracted in the output unit. By inputting input data of a specific machining block during normal operations, normal scores in which the features of the input data are extracted are generated from the output unit, thus serving to detect an indication of the occurrence of chatter in a tool for a machine tool with high accuracy.

When embodying unsupervised learning according to this embodiment, the neural network may be applied to, for example, k-means non-hierarchical clustering, an auto-encoder for dimensional compression in hierarchical clustering, or the like. When the learning circuit 2a (machine learning device 2) is practically constituted of the neural network, a general-purpose computer or processor may be used. However, using, for example, GPGPU (general-purpose computing on graphic processing units), a large-scale PC cluster or the like allows for processing at higher speed.

The machine learning device, the CNC device and the machine learning method according to the present invention have the effect of reducing the number of poor workpieces by detecting an indication of the occurrence of chatter in the tool for the machine tool.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device for detecting an indication of an occurrence of chatter in a tool for a machine tool, comprising:
   a state observation unit which observes state variables including a vibration of the machine tool itself, at least one of a vibration of a building in which the machine tool is installed, an audible sound, and an acoustic emission, and a motor control current value of the machine tool; and
   a learning unit which generates a learning model based on the state variables observed by the state observation unit, wherein
   the learning unit
      generates the learning model by performing unsupervised learning based on the state variables during normal operation in which no chatter occurs in a specific machining block, and
      generates and outputs a normal score during the normal operation in which no chatter occurs in the specific machining block, and an abnormal score when there is an indication of the occurrence of chatter in the machining block; and
   the machine learning device further comprises:
      an output utilization unit which determines whether a score based on the state variables of the machining block corresponds to the normal score or the abnormal score, in order to detect an indication of the occurrence of chatter in the tool for the machine tool.

2. The machine learning device according to claim 1, further comprising a neural network.

3. The machine learning device according to claim 1, wherein
   the machine tool includes:
      a vibration sensor which detects the vibration of the machine tool itself and provided in a holder or bit of the tool; and
      at least one of an audible sound sensor which detects the audible sound, and an acoustic emission sensor which detects the acoustic emission.

4. The machine learning device according to claim 1, wherein the machine tool includes a vibration sensor which detects the vibration of the building in which the machine tool is installed.

5. The machine learning device according to claim 1, wherein the machine tool includes a current sensor which detects a motor control current value of the machine tool.

6. The machine learning device according to claim 5, wherein the current sensor is provided in a motor amplifier for driving a motor of the machine tool.

7. A CNC device, comprising:
   a learning circuit which constitutes a machine learning device for detecting an indication of an occurrence of chatter in a tool for a machine tool, wherein the machine learning device includes
   a state observation unit which observes state variables including a vibration of the machine tool itself, at least one of a vibration of a building in which the machine tool is installed, an audible sound, and an acoustic emission, and a motor control current value of the machine tool; and
   a learning unit which generates a learning model based on the state variables observed by the state observation unit, wherein the learning unit
      generates the learning model by performing unsupervised learning based on the state variables during normal operation in which no chatter occurs in a specific machining block, and
      generates and outputs a normal score during the normal operation in which no chatter occurs in the specific machining block, and an abnormal score when there is an indication of the occurrence of chatter in the machining block; and
   an output utilization unit which determines whether a score based on the state variables of the machining block corresponds to the normal score or the abnormal score, in order to detect an indication of the occurrence of chatter in the tool for the machine tool, and
   wherein the CNC device controls the machine tool.

8. The CNC device according to claim 7, further comprising:
   a determination circuit which compares a score outputted from the learning circuit with a certain determination reference value to make a determination; and
   a CPU which outputs a stop signal to the machine tool based on a determination result from the determination circuit.

9. The CNC device according to claim 8, wherein the CPU outputs a warning signal to a host management system based on the determination result from the determination circuit.

10. A machine learning method for detecting an indication of an occurrence of chatter in a tool for a machine tool, comprising:
    observing state variables including a vibration of the machine tool itself, at least one of a vibration of a building in which the machine tool is installed, an audible sound and an acoustic emission, and a motor control current value of the machine tool; and
    generating a learning model by unsupervised learning based on the observed state variables, wherein
    the generating the learning model includes
       generating the learning model by performing unsupervised learning based on the state variables during normal operation in which no chatter occurs in a specific machining block, and generating and outputting a normal score during the normal operation in which no chatter occurs in the specific machining block, and an abnormal score when there is an indication of the occurrence of chatter in the machining block; and the machine learning method further comprises:

determining whether a score based on the state variables of the machining block corresponds to the normal score or the abnormal score, in order to detect an indication of the occurrence of chatter in the tool for the machine tool.

11. The machine learning device according to claim 1, wherein the output utilization unit is configured to compare the score based on the state variables of the machining block with a plurality of the normal scores generated by the learning unit to determine whether the score is abnormal.

* * * * *